United States Patent
Simonian et al.

(10) Patent No.: US 6,736,423 B2
(45) Date of Patent: May 18, 2004

(54) APPARATUS AND METHOD FOR DAMPING VIBRATION OF A VEHICLE PART

(75) Inventors: Stepan S. Simonian, Torrance, CA (US); Charles S. Pillsbury, IV, Rochester, MI (US); William P. Braun, Romeo, MI (US); A. Dale Parker, Rancho Palos Verdes, CA (US)

(73) Assignees: TRW Vehicle Safety Systems Inc., Lyndhurst, OH (US); TRW Inc., Lyndhurst, OH (US)

( * ) Notice: Subject to any disclaimer, the term of this patent is extended or adjusted under 35 U.S.C. 154(b) by 0 days.

(21) Appl. No.: 10/195,799

(22) Filed: Jul. 15, 2002

(65) Prior Publication Data

US 2004/0007858 A1 Jan. 15, 2004

(51) Int. Cl.[7] .............................. F16F 15/10; H02K 5/24
(52) U.S. Cl. ........................... 280/731; 74/574; 310/51; 464/180
(58) Field of Search .................. 280/731; 74/552, 74/574; 464/180; 248/638; 310/51

(56) References Cited

U.S. PATENT DOCUMENTS

| | | | | |
|---|---|---|---|---|
| 3,131,415 A | * | 5/1964 | Dapses | 15/256.51 |
| 3,575,270 A | * | 4/1971 | Wagenfuhrer et al. | 192/107 R |
| 4,674,763 A | | 6/1987 | Schlagenhaufer | 280/602 |
| 5,502,342 A | * | 3/1996 | Feldkamp et al. | 310/51 |
| 5,678,840 A | | 10/1997 | Simonian | 280/602 |
| 5,775,049 A | | 7/1998 | Fricke | 52/720.1 |
| 5,924,261 A | | 7/1999 | Fricke | 52/720.1 |
| 6,224,341 B1 | | 5/2001 | Fricke | 416/248 |
| 6,237,302 B1 | | 5/2001 | Fricke | 52/720.1 |
| 6,296,416 B1 | | 10/2001 | Oreans et al. | 403/220 |

OTHER PUBLICATIONS

U.S. Ochiai et al. patent application No. US 2002/0023517 A1, published Feb. 28, 2002 entitled Steering Wheel..

* cited by examiner

*Primary Examiner*—Robert P. Swiatek
(74) *Attorney, Agent, or Firm*—Tarolli, Sundheim, Covell & Tummino L.L.P.

(57) ABSTRACT

An apparatus and method for damping vibration of a vehicle part, such as a steering wheel or an electric motor. According to one embodiment, an apparatus (26) for damping vibration of a vehicle part (12) includes at least one container (50) having a chamber (56) defined by at least one interior wall (58). The container (50) is associated with the vehicle part (12). A plurality of particles (52) is disposed in the chamber (56). The particles (52), when at rest, occupy a first portion (82) of the chamber (56) and define an unoccupied second portion (84) of the chamber. The particles (52) move back and forth between the first and second portions (82 and 84) of the chamber (56) in response to vibration of the vehicle part (12) and collide with each other and with the interior wall (58) defining the chamber to damp the vibration of the vehicle part.

41 Claims, 11 Drawing Sheets

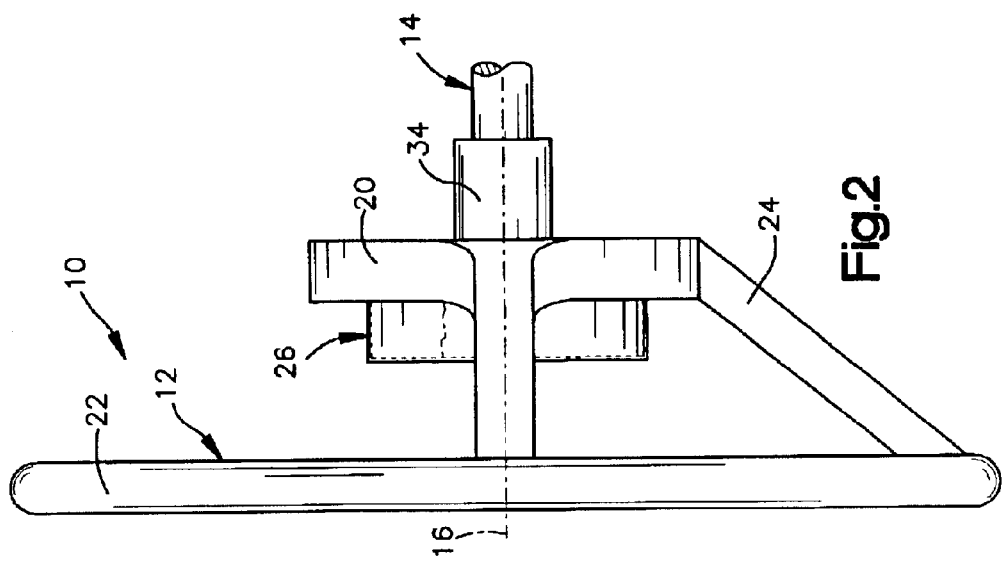
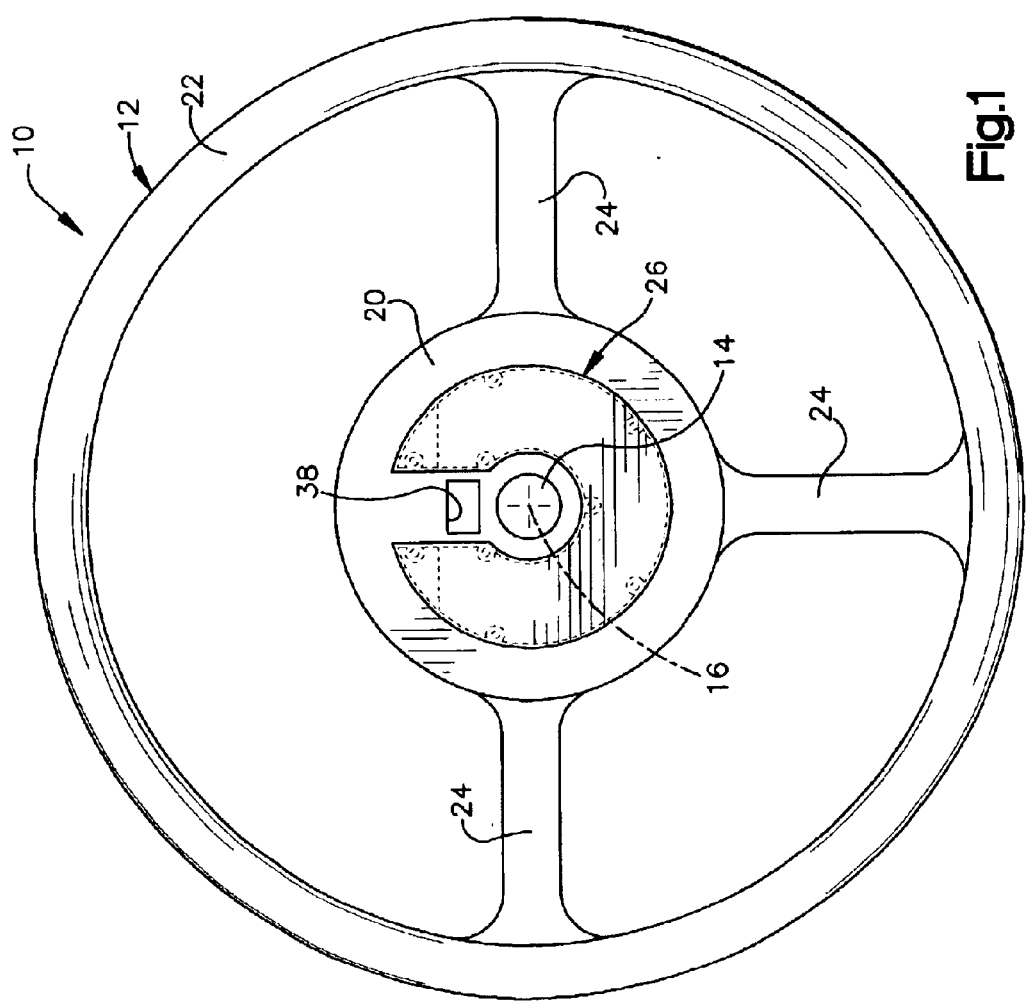

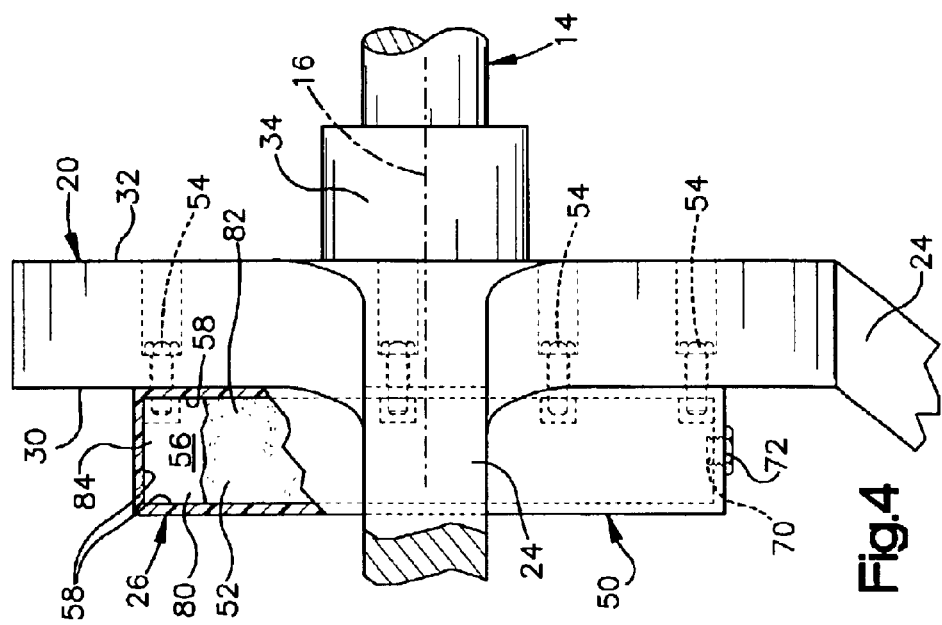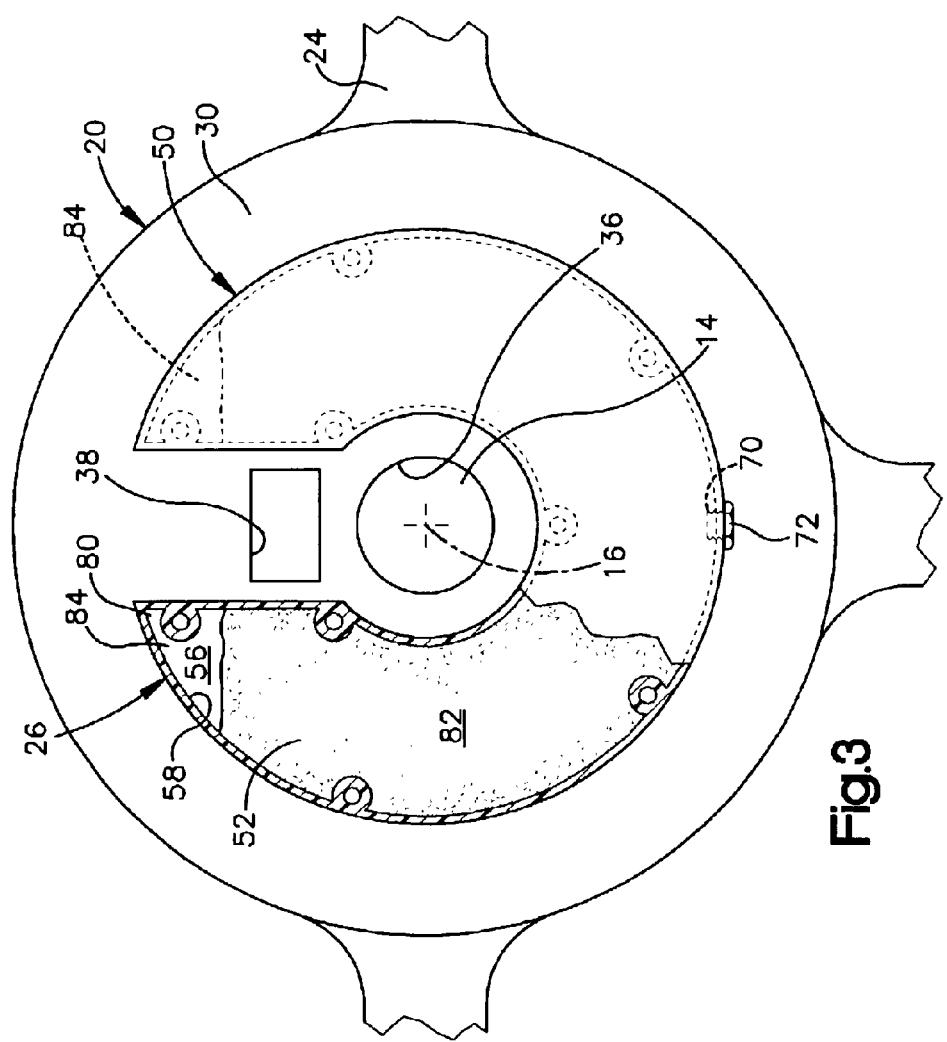

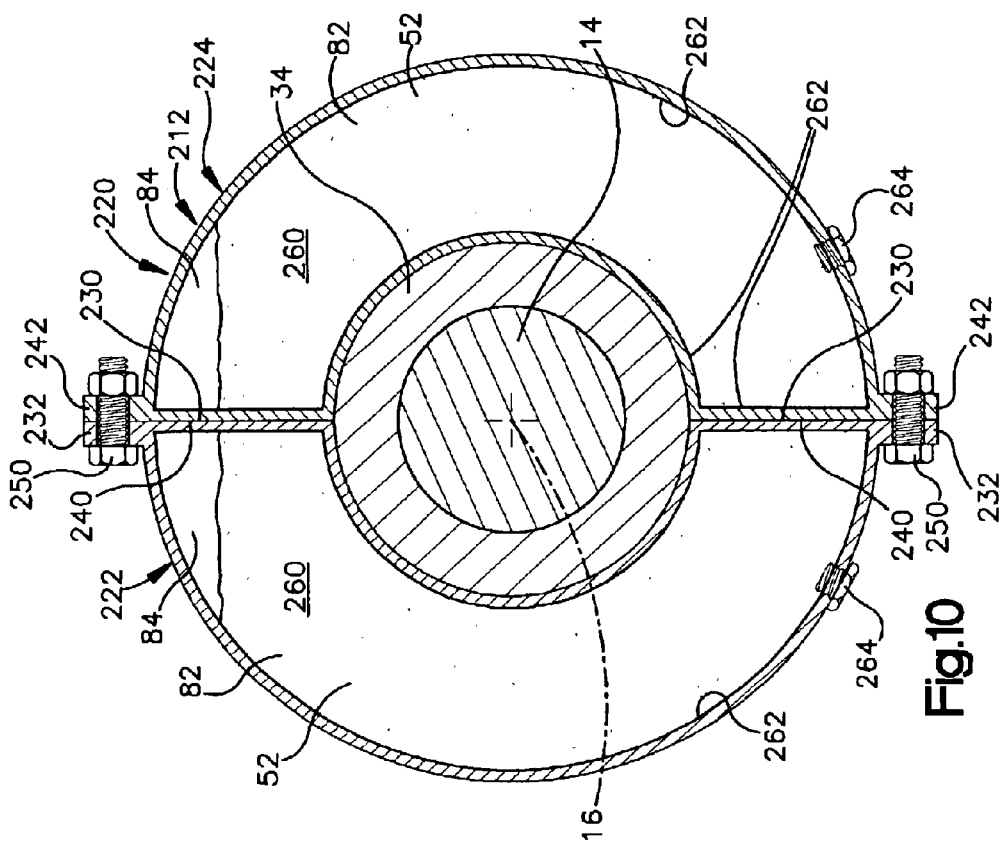
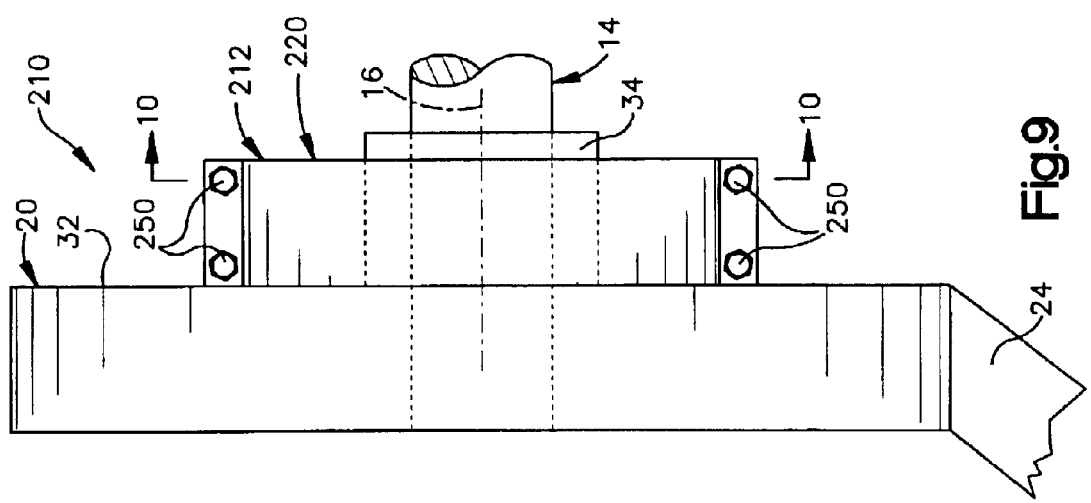

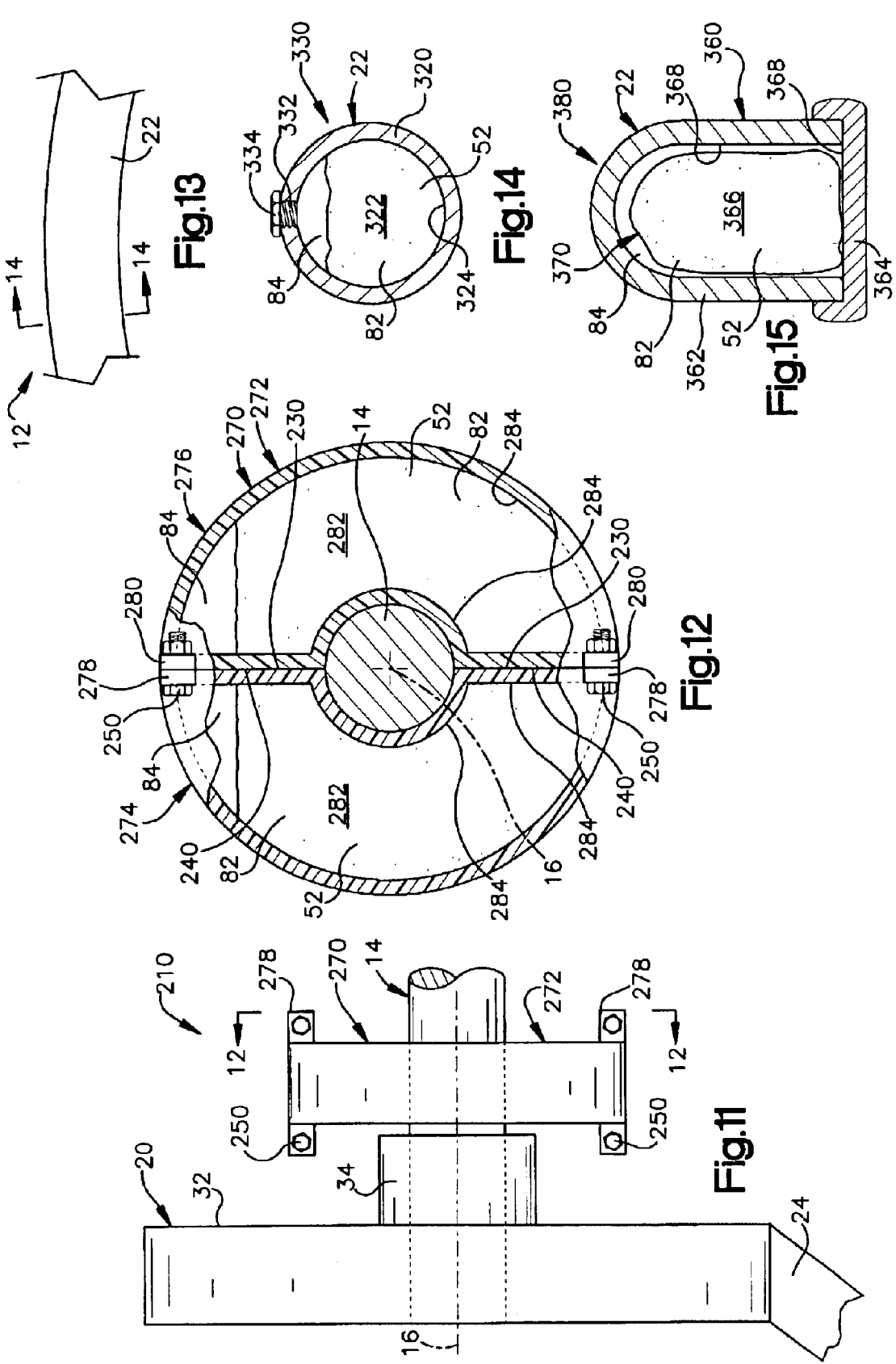

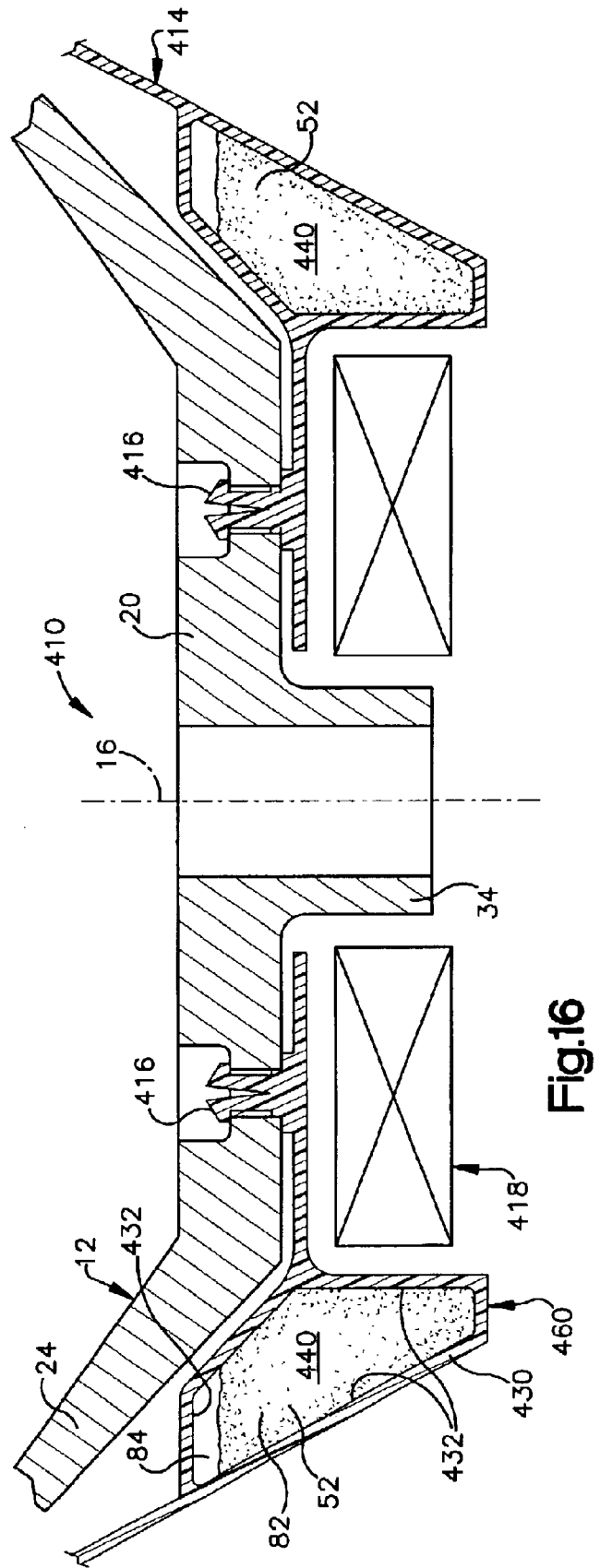

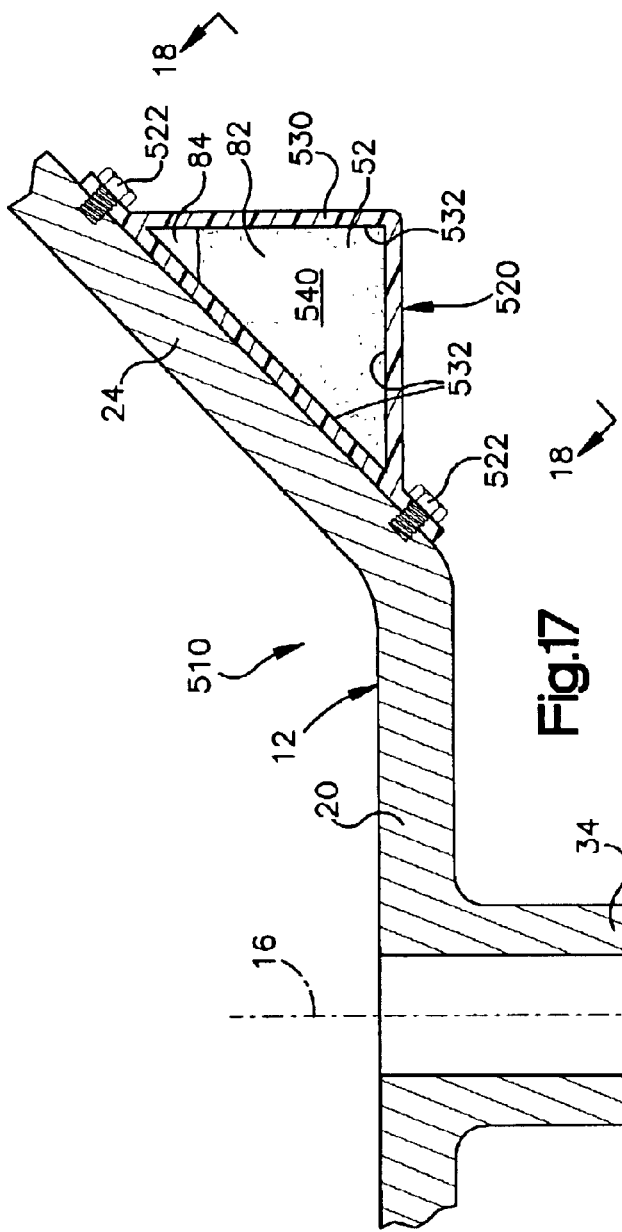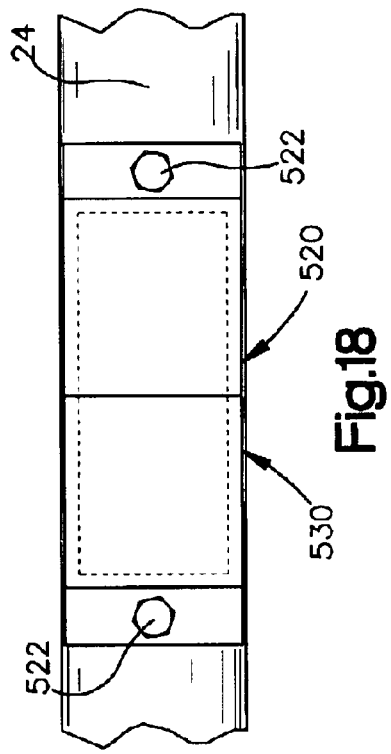

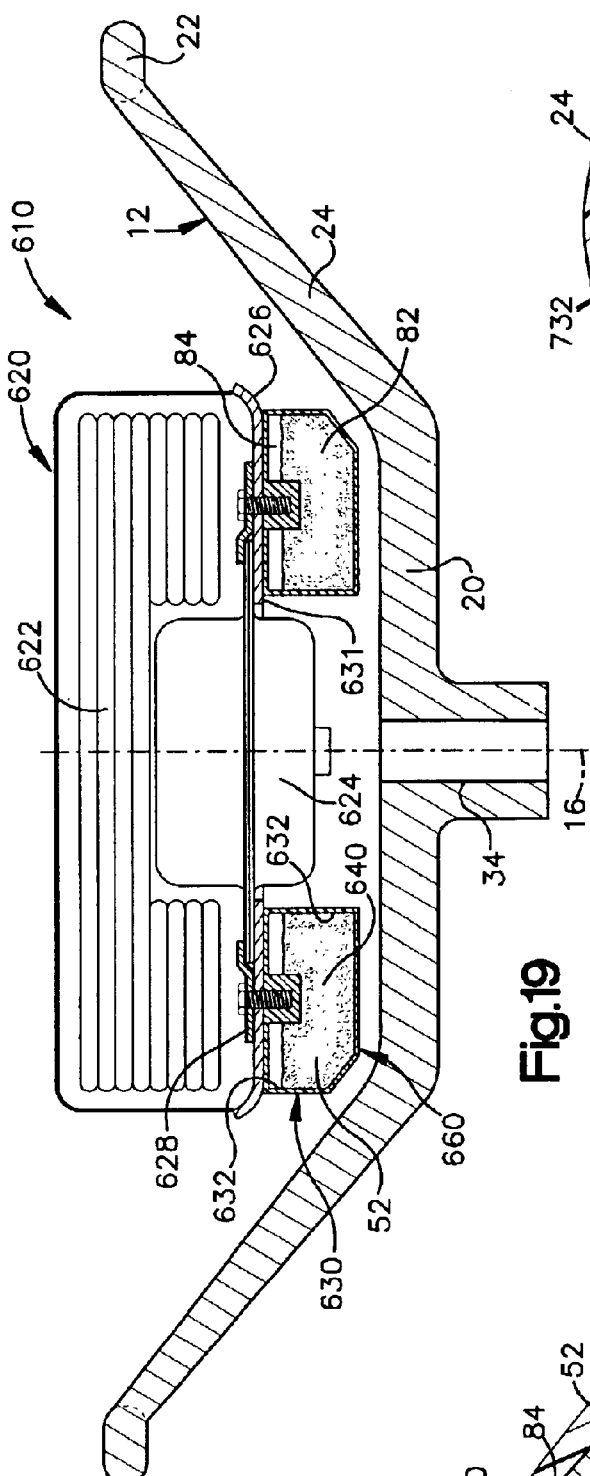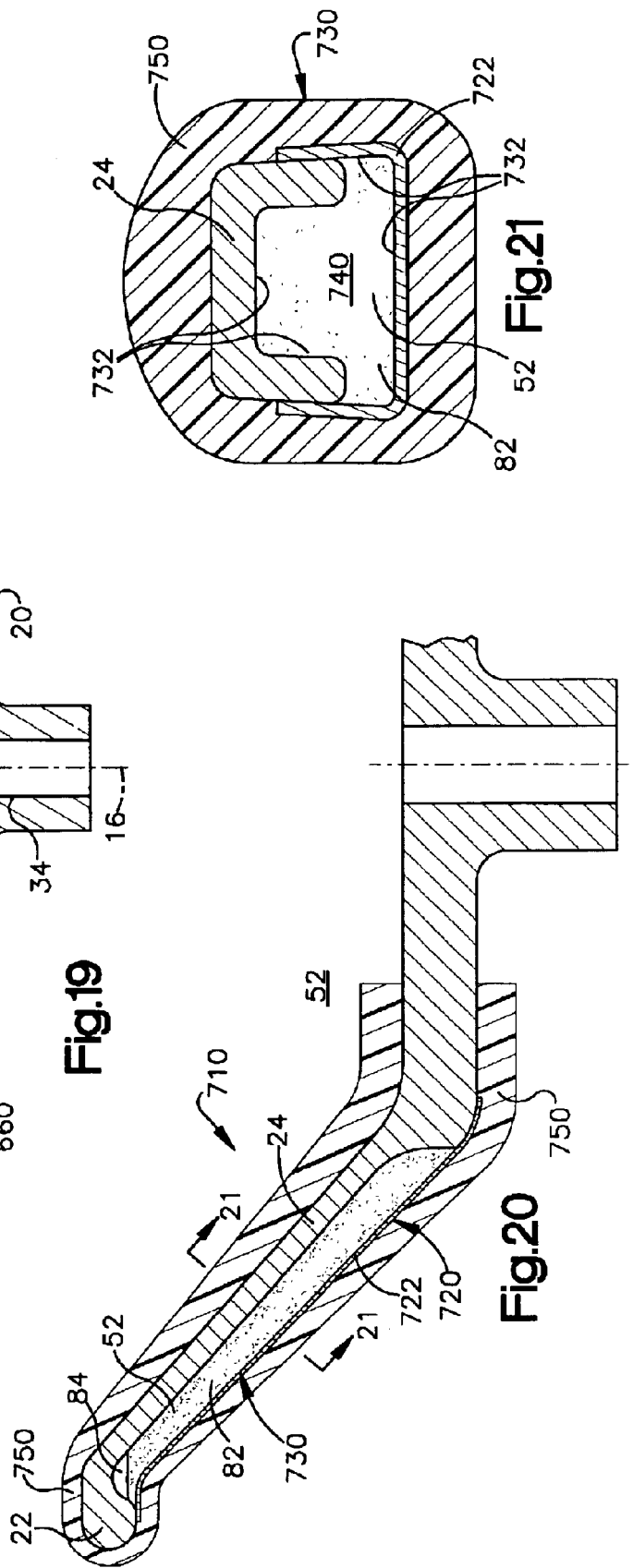

APPARATUS AND METHOD FOR DAMPING VIBRATION OF A VEHICLE PART

TECHNICAL FIELD

The present invention is directed to an apparatus and method for damping vibration of a vehicle part, such as a vehicle steering wheel or an electric motor.

BACKGROUND OF THE INVENTION

Vehicle parts, such as a vehicle steering wheel or an electric motor, can be prone to unwanted vibration. The steering wheel is prone to vibration because it is mounted at one end of the steering column which acts as a cantilever. Vibratory inputs, such as, for example, vibration resulting from an engine imbalance or from the driving surface, are transmitted through the steering shaft to the steering wheel, where the vibration is felt by the driver of the vehicle.

In order to reduce the amplitude of steering wheel vibration felt by the vehicle driver, it is known to attach a tuned mass damper to the steering wheel to counteract the vibration. A tuned mass damper is a discrete oscillating device commonly formed by a spring-like element, such as an elastomeric member, and a mass arranged in parallel. The tuned mass damper is tuned to an excitation frequency that is resonant with the natural frequency of the steering wheel/column assembly. Vibration of the steering wheel is suppressed by an inertial force created by the tuned mass damper moving out of phase with the vibration of the steering wheel. One limitation, however, of a tuned mass damper is that the tuned mass damper is tuned to a relatively narrow frequency range and thus does not damp vibration outside the narrow frequency range. Hence, a need exists for a vibration damping apparatus for a vehicle steering wheel that is effective across a relatively broad frequency range. Such a damping apparatus could also be adapted to damp vibration of various other parts in a vehicle, such as an electric motor.

Electric motors can operate at a single rotational speed, or can operate over a range of rotational speeds. An electric motor, such as is used in connection with an electric powered hydraulic system, may be structurally excited when the operation speed (or a multiple thereof) corresponds with a model frequency of the motor, which generates unwanted vibration and/or noise. It is desirable to provide an apparatus for damping the structural mode's of an electric motor and thereby reduce the amplitude of resonant vibrations and noise.

SUMMARY OF THE INVENTION

The present invention is an apparatus for damping vibration of a vehicle part. The apparatus comprises at least one container having a chamber defined by at least one interior wall. The at least one container is associated with the vehicle part. A plurality of particles is disposed in the chamber. The particles, when at rest, occupy a first portion of the chamber and define an unoccupied second portion of the chamber. The particles move back and forth between the first and second portions of the chamber in response to vibration of the vehicle part and collide with each other and with the at least one interior wall defining the chamber to damp the vibration of the vehicle part through a momentum exchange between the particles and the at least one interior wall, through inter-particle dry friction and dry friction between the particles and the at least one interior wall, and through plastic deformation of the particles.

In accordance with another aspect of the present invention, an apparatus comprises a vehicle steering assembly and at least one container associated with the vehicle steering assembly. The at least one container has a chamber defined by at least one interior wall. A plurality of particles is disposed in the chamber. The particles, when at rest, occupy a first portion of the chamber and define an unoccupied second portion of the chamber. The particles move back and forth between the first and second portions of the chamber in response to vibration of the vehicle steering assembly and collide with each other and with the at least one interior wall defining the chamber to damp the vibration of the vehicle steering assembly through a momentum exchange between the particles and the at least one interior wall, through inter-particle dry friction and dry friction between the particles and the at least one interior wall, and through plastic deformation of the particles.

In accordance with yet another aspect of the present invention, an apparatus for use in a vehicle comprises an electric motor and at least one container associated with the electric motor. The at least one container has a chamber defined by at least one interior wall. A plurality of particles is disposed in the chamber. The particles, when at rest, occupy a first portion of the chamber and define an unoccupied second portion of the chamber. The particles move back and forth between the first and second portions of the chamber in response to vibration of the electric motor and collide with each other and with the at least one interior wall defining the chamber to damp the vibration of the electric motor through a momentum exchange between the particles and the at least one interior wall, through inter-particle dry friction and dry friction between the particles and the at least one interior wall, and through plastic deformation of the particles.

The present invention also provides a method for damping vibration of a vehicle part. According to the inventive method, at least one container having a chamber defined by at least one interior wall is provided. The at least one container is associated with the vehicle part. The chamber in the at least one container is partially filled with a plurality of particles so that a first portion of the chamber is occupied by the particles when at rest, while a second portion of the chamber remains unoccupied. Vibration of the vehicle part is damped through movement of the particles back and forth between the first and second portions of the chamber in response to the vibration of the vehicle part. The particles collide with each other and with the at least one interior wall defining the chamber to damp the vibration of the vehicle part through a momentum exchange between the particles and the at least one interior wall, through inter-particle dry friction and dry friction between the particles and the at least one interior wall, and through plastic deformation of the particles.

In accordance with yet another aspect of the present invention, a method for damping vibration of a vehicle steering assembly is provided. According to the inventive method, at least one container having a chamber defined by at least one interior wall is provided. The at least one container is associated with the vehicle part. The chamber in the at least one container is filled 70% to 98% with a plurality of particles so that a first portion of the chamber is occupied by the particles when at rest, while a second portion of the chamber remains unoccupied. Vibration of the vehicle steering assembly is damped through movement of the particles back and forth between the first and second portions of the chamber in response to the vibration of the vehicle steering assembly. The particles collide with each other and with the at least one interior wall defining the chamber to damp the vibration of the vehicle steering assembly through a momentum exchange between the particles and the at least one interior wall, through inter-particle dry friction between the particles and the at least one interior wall, and through plastic deformation of the particles.

In accordance with still another aspect of the invention, a method for damping vibration of an electric motor in a vehicle is provided. According to the inventive method, at least one container having a chamber defined by at least one interior wall is provided. The at least one container is associated with the electric motor. The chamber in the at least one container is filled 70% to 98% with a plurality of particles so that a first portion of the chamber is occupied by the particles when at rest while a second portion of the chamber remains unoccupied. Vibration of the electric motor is damped through movement of the particles back and forth between the first and second portions of the chamber in response to the vibration of the electric motor. The particles collide with each other and the at least one interior wall defining the chamber to damp the vibration of the electric motor through a momentum exchange between the particles and the at least one interior wall, through inter-particle dry friction and dry friction between the particles and the at least one interior wall, and through plastic deformation of the particles.

BRIEF DESCRIPTION OF THE DRAWINGS

The foregoing and other features of the invention will become more apparent to one skilled in the art upon consideration of the following description of the invention and the accompanying drawings in which:

FIG. 1 is a front view of a steering column assembly constructed in accordance with a first embodiment of the present invention;

FIG. 2 is a side view of the steering column assembly shown in FIG. 1;

FIG. 3 is an enlarged front view partly in section, of a portion of FIG. 1;

FIG. 4 is a side view, partly in section, of FIG. 3;

FIG. 9 is a side view of a steering column assembly constructed in accordance with a second embodiment of the present invention;

FIG. 10 is a view taken along line 10—10 in FIG. 9;

FIG. 11 is a view similar to FIG. 9 illustrating an alternate construction of the steering column assembly of FIG. 9;

FIG. 12 is a sectional view taken along line 12—12 in FIG. 11;

FIG. 13 is a front view of a rim portion of a steering column assembly constructed in accordance with a third embodiment of the present invention;

FIG. 14 is a sectional view taken along line 14—14 in FIG. 13;

FIG. 15 is a view similar to FIG. 14 showing an alternate construction of the third embodiment;

FIG. 16 is a sectional view of a steering column assembly constructed in accordance with a fourth embodiment of the present invention;

FIG. 17 is a sectional view of a portion of a steering column assembly constructed in accordance with a fifth embodiment of the present invention;

FIG. 18 is a view taken along line 18—18 in FIG. 17;

FIG. 19 is a sectional view of a steering column assembly constructed in accordance with a sixth embodiment of the present invention;

FIG. 20 a sectional view of a steering column assembly constructed in accordance with a seventh embodiment of the present invention;

FIG. 21 is a sectional view taken along line 21—21 in FIG. 20;

DESCRIPTION OF EMBODIMENTS

Figure 5:
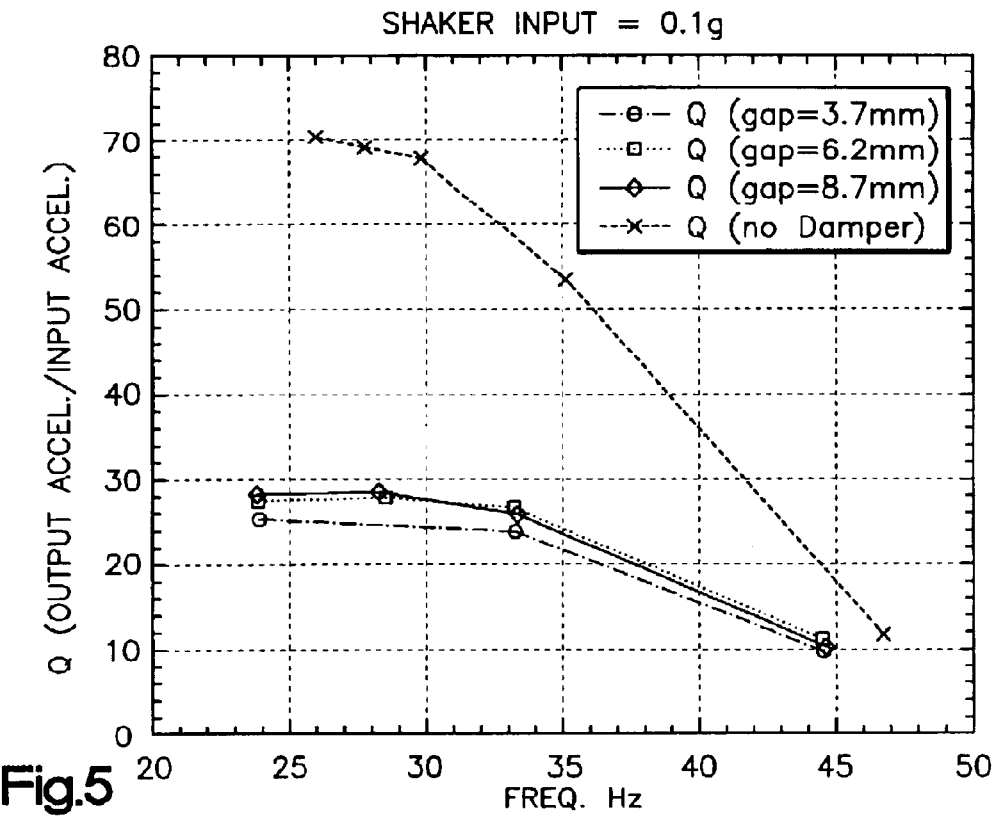
FIGS. 5–7 are graphs of test data illustrating the effectiveness of the present invention in reducing vibration amplification.

The present invention is directed to an apparatus and method for damping vibration of a vehicle part, such as a vehicle steering wheel. As representative of the present invention, FIGS. 1 and 2 illustrate a portion of a vehicle steering column assembly 10, including a vehicle steering wheel 12 that is attached to a vehicle steering shaft 14. As is known in the art, the steering shaft 14 is connected, in a manner not shown, to steerable wheels (not shown) of a vehicle. The steering wheel 12 is rotatable about an axis 16 to cause the steering shaft 14 to rotate. In turn, the rotation of the steering shaft 14 causes the steerable wheels to turn laterally of the vehicle.

The steering wheel 12 comprises an armature that includes a centrally located hub portion 20, an annular rim portion 22, and a plurality of spokes 24 that extend between the hub portion and the rim portion. The hub portion 20, the rim portion 22, and the spokes 24 may be cast as a single component or, alternatively, may be formed individually and then joined together in a known manner, such as welding. The steering wheel 12 further includes a damper 26 for damping steering wheel vibration as described further below.

As shown in FIG. 3, the hub portion 20 of the steering wheel 12 has a generally circular shape, but it should be understood that the hub portion could have a different shape. The hub portion 20 includes oppositely disposed first and second surfaces 30 and 32. The hub portion 20 further includes an axial projection 34 (FIG. 4) that extends from the second surface 32 and an opening 36 (FIG. 3) for receiving one end of the steering shaft 14. The opening 36 extends through the axial projection 34 along the axis 16. Above (as viewed in FIGS. 3 and 4) the opening 36, the hub portion 20 has a hole 38 for providing access to a clock spring (not shown).

The damper 26 comprises a container 50 and a plurality of particles 52 inside the container. The container 50 is attached to the first surface 30 of the hub portion 20 of the steering wheel 12 by a plurality of screws 54. It should be understood that other suitable means for fastening the container 50 to the hub portion 20 could also be used. The container 50 has a partial ring shape that resembles a horseshoe. The container 50 may be made of a lightweight metal, a polymer, or other suitable material. The container 50 has an internal chamber 56 defined by a plurality of interior walls 58. A fill port 70 extends through one of the interior walls 58 and into the chamber 56. The fill port 70 receives a plug 72 that closes and seals the fill port.

Although not illustrated in FIG. 4, it should be understood that the first surface 30 of the hub portion 20 could serve as one of the interior walls 58 of the container 50 that defines the chamber 56. Further, it should be apparent to those skilled in the art that the container 50 could be subdivided into two or more separate containers that together have the same overall shape as is shown in FIGS. 3 and 4.

The particles 52 are located inside the chamber 56 in the container 50. The particles 52 are placed into the chamber 56 through the fill port 70. All of the particles 52 are made out of the same material, which may be a metal, a metal alloy, a metallic oxide, a ceramic, a glass, or a polymer. Each particle 52 can range in size from 10 microns to 2.0 mm. At the lower end of this size range, the particles 52 can be considered a powder. In the illustrated embodiment, the particles 52 can have a total weight of 0.1 lbs. to 10 lbs.

The chamber 56 in the container 50 is only partially filled with the particles 52 so that at least one space 80 is formed in the chamber. The particles 52 occupy a first portion 82 of the chamber 56 and the unoccupied space 80 between the particles and the interior walls 58 forms a second portion 84 of the chamber. The first portion 82 of the chamber 56 occupied by the particles 52 is 70% to 98% of the total volume of the chamber.

When the steering wheel 12 is caused to vibrate, such as by a vibratory input transmitted to the steering wheel through the steering shaft 14, the damper 26 is effective to reduce the amplitude of the steering wheel vibration. It is contemplated that all types of vibratory inputs can be damped by the damper 26. The vibration of the steering wheel 12 causes the particles 52 in the container 50 to move back and forth between the first and second portions 82 and 84 of the chamber 56. As the particles 52 move back and forth, the particles collide with the interior walls 58 of the chamber 56 and dissipate a portion of the vibrational energy through a momentum exchange. Further, vibrational energy is dissipated through dry friction as the particles 52 rub against the interior walls 58. Dissipation of vibrational energy is also provided through inter-particle dry friction as the particles 52 rub against each other during their movement back and forth in the chamber 56. Finally, plastic deformation of the particles 52 at the microscopic level also serves to dissipate vibrational energy.

Figure 6:
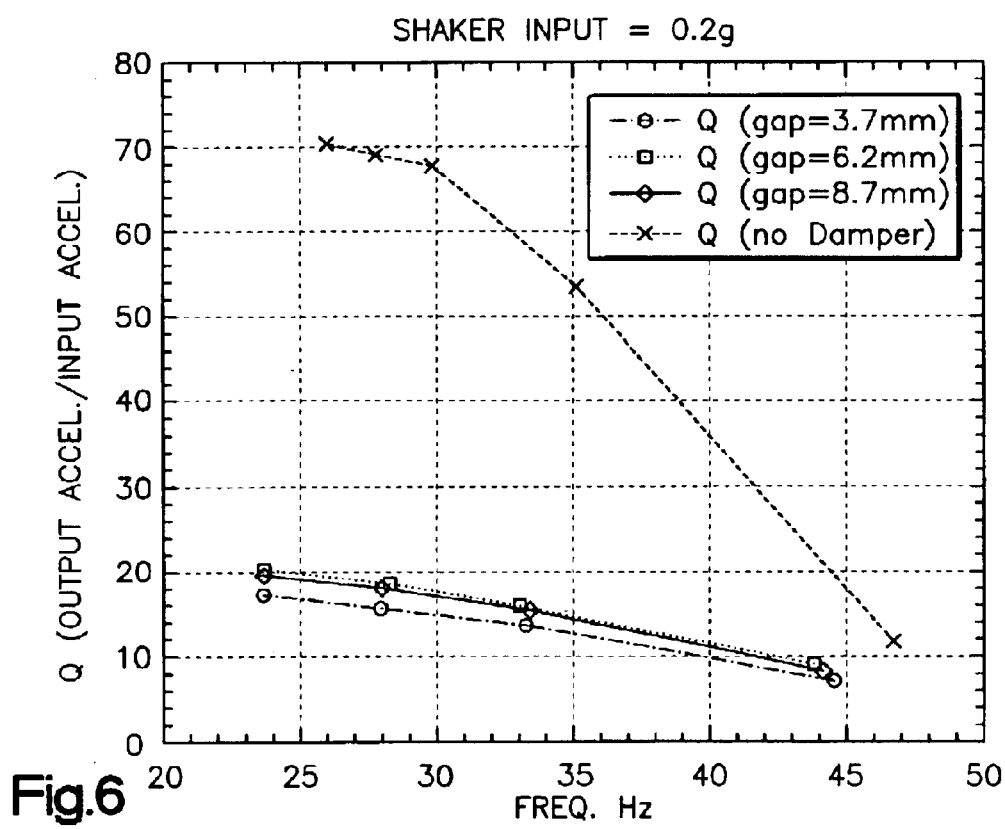
Figure 7:
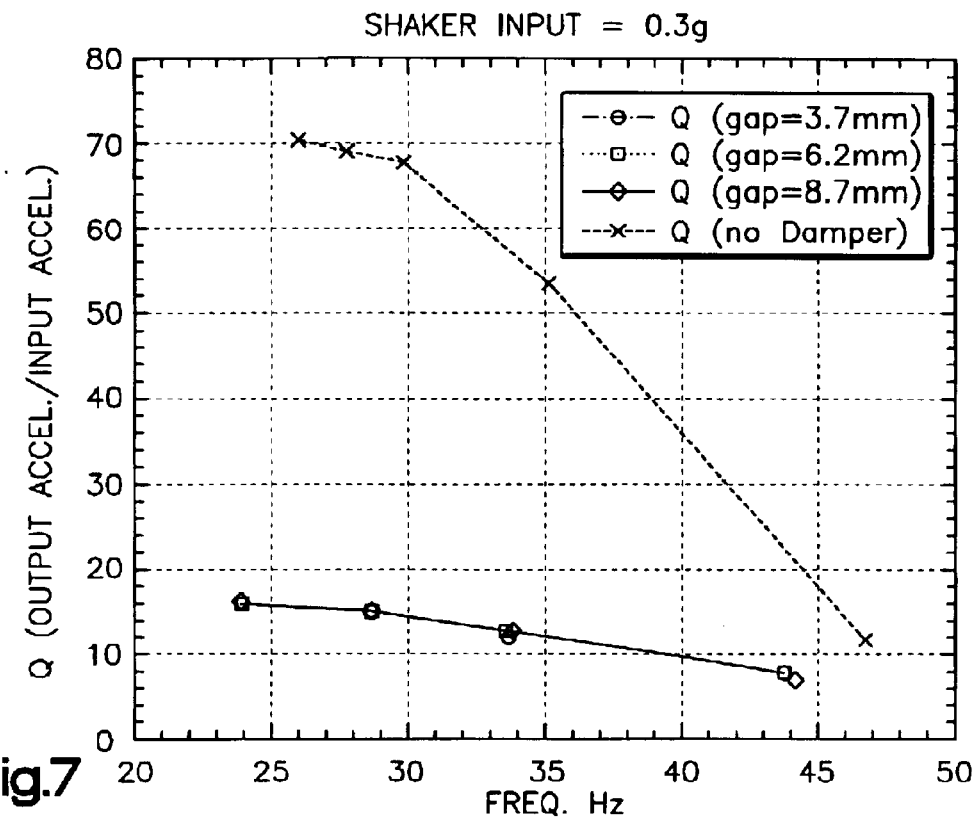

Depending on the amplitude of the steering wheel vibration to be damped, the size of the unoccupied space 80 in the chamber 56 can be varied between 2% and 30% of the total volume of the chamber. FIGS. 5–7 are test results that graphically illustrate the effectiveness of the damper 26 in reducing vibration amplitude for a simulated vehicle steering wheel weighing 8.8 lbs. The chamber in the container used for the testing was rectangular in shape (98 mm high, 40 mm wide, 15 mm deep) and had a volume of approximately 60 cm$^3$. The chamber was partially filled with lead shot having a total weight of approximately 320 grams. FIGS. 5–7 also illustrate the relative effect of various sizes of the unoccupied space 80 in the chamber 56. The "gaps" referred to in FIGS. 5–7 are distances between the top of the particles 52 and the upper surface of the container used in the tests. In addition, FIGS. 5–7 show that the damper 26 is effective at reducing the vibration amplitude across a relatively broad frequency range (24–45 Hz), and that the damper continues to be effective as the vibrational input goes from 0.1 g to 0.3 g's.

It is contemplated that the damper 26 according to the present invention can effectively damp vibration outside the 0.1 g to 0.3 g range and at frequencies outside of the 24–45 Hz range through proper selection of (i) the total weight of the particles 52, (ii) the total volume of the chamber 56, and (iii) the amount of unoccupied space 80 in the container 50. These selections are best made through empirical testing for each specific application of the present invention. It should also be apparent that shape and orientation of the chamber 56 can be varied to effect the damping characteristics of the damper 26.

Figure 8:
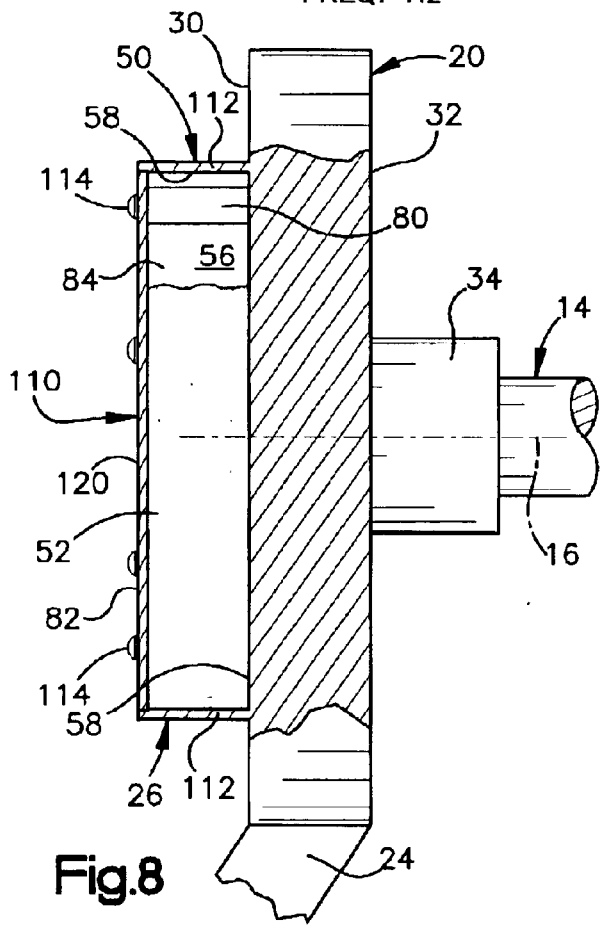
FIG. 8 is a view similar to FIG. 4 illustrating an alternate construction of the steering column assembly of FIGS. 1–4.

FIG. 8 illustrates an alternate construction of the steering column assembly 10 shown in FIGS. 1–4. In FIG. 8, reference numbers that are the same as reference numbers used in FIGS. 1–4 designate components that are the same as components in FIGS. 1–4.

As may be seen in FIG. 8, a portion of a container 110 for the damper 26 is formed, such as by casting, along with the hub portion 20 of the steering wheel 12. More specifically, side walls 112 of the container 110 project axially from the first surface 30 of the hub portion 20. Within the confines of the side walls 112, the first surface 30 of the hub portion 20 serves as one of the interior walls 58 of the container 110. A cover plate 120 is attached, by fasteners 114 or other suitable means, to the side walls 112 of the container 110 to close and seal the chamber 56. The particles 52 are placed into the chamber 56 prior to the cover plate 120 being attached. Alternatively, the particles 52 may be placed into the chamber 56 after the cover plate 112 is attached by inserting the particles 52 through a fill port (not shown).

FIGS. 9 and 10 illustrate a steering column assembly 210 constructed in accordance with a second embodiment of the present invention. In FIGS. 9 and 10, reference numbers that are the same as those used in the first embodiment of FIGS. 1–4 designate components that are the same as components in the first embodiment.

According to the second embodiment, the steering wheel assembly 210 includes a damper 212 that is disposed coaxially about the axial projection 34 of the hub portion 20 of the steering wheel 12. The damper 212 comprises a collar 220 formed by first and second semi-circular containers 222 and 224 that are joined together. The first container 222 has a pair of radially extending end surfaces 230 and a pair of flanges 232 that project radially outward from the periphery of the first container. Similarly, the second container 224 has a pair of radially extending end surfaces 240 and a pair of flanges 242 that project radially outward from the periphery of the second container.

When the first and second containers 222 and 224 are brought together to form the collar 220, the end surfaces 230 and the flanges 232 on the first container 222 abut the end surfaces 240 and the flanges 242, respectively, on the second container 224. Fasteners 250 are used to secure the flanges 232 on the first container 222 to the flanges 242 on the second container 224. When the fasteners 250 are fully tightened, the containers 222 and 224 clamp against the axial projection 34 to secure the damper 212 to the axial projection. Alternatively, setscrews (not shown) or other means, such as brackets (not shown), could be used to secure the damper 212 around the axial projection 34.

Each of the first and second containers 222 and 224 has an internal chamber 260 defined by a plurality of interior walls 262. The chambers 260 are partially (70% to 98%) filled with the particles 52, thereby forming the first and second portions 82 and 84 described above. The particles 52 are placed in the chamber 260 in each of the first and second containers 222 and 224 through fill ports (not numbered). The fill ports are closed and sealed by plugs 264.

The damper 212 functions to reduce the amplitude of the steering wheel vibration in the same basic manner as the damper 26 described above with regard to the first embodiment of FIGS. 1–4. Vibration of the steering wheel 12 causes the particles 52 in each of the first and second containers 222 and 224 to move back and forth in the chamber 260 in each of the containers 222 and 224. The collision of the particles 52 with each other and with the interior walls 262 inside each of the respective chambers 260 dissipates vibrational energy and thus damps vibration of the steering wheel 12.

FIGS. 11 and 12 illustrate an alternate construction of the steering column assembly 210 illustrated in FIGS. 9 and 10. In FIGS. 11 and 12, reference numbers that are the same as those used in the previous embodiments designate components that are the same as components in the previous embodiments.

FIG. 11 shows a damper 270 that is disposed coaxially about the steering shaft 14. The damper 270 comprises a collar 272 formed by first and second containers 274 and 276 that are joined together. The first container 274 has a pair of axially projecting flanges 278. Similarly, the second container 272 has a pair of axially projecting flanges 280. When the first and second containers 274 and 276 are brought together to form the collar 272, the end surfaces 230 and the flanges 278 on the first container 274 abut the end surfaces 240 and the flanges 280, respectively, on the second container 276. Fasteners 250 are used to secure the flanges 278 on the first container 274 to the flanges 280 on the second container 276. When the fasteners 250 are fully tightened, the containers 274 and 276 clamp against the axial projection 34 to secure the damper 270 to the axial projection. Alternatively, setscrews (not shown) or other means, such as brackets (not shown), could be used to secure the damper 270 around the axial projection 34.

Each of the first and second containers 274 and 276 has an internal chamber 282 defined by a plurality of interior walls 284. The chambers 282 are partially (70% to 98%) filled with the particles 52, thereby forming the first and second portions 82 and 84 described above. The particles 52 are placed in the chamber 282 in each of the first and second containers 274 and 276 through fill ports (not shown), that are then closed and sealed by the plugs (not shown).

The damper 270 functions to reduce the amplitude of the steering wheel vibration in the same manner as the damper 212 described above with regard to FIGS. 9 and 10. Vibration of the steering wheel 12 causes the particles 52 in each of the first and second containers 274 and 276 to move back and forth in the chamber 282 in each of the containers. The collision of the particles 52 with each other and with the interior walls 284 inside each of the respective chambers 282 dissipates vibrational energy and thus damps vibration of the steering wheel 12.

FIGS. 13 and 14 illustrate a third embodiment of the present invention. In FIGS. 13 and 14, reference numbers that are the same as those used in the first embodiment of FIGS. 1–4 designate components that are the same as components in the first embodiment.

According to the third embodiment, the rim portion 22 of the steering wheel 12 is hollow and forms a container 320 (FIG. 14). The container 320 has an annular chamber 322 defined by an interior wall 324. The chamber 322 is partially (70% to 98%) filled with the particles 52 described above to create a damper 330. The chamber 322 includes the first portion 82 occupied by the particles 52 and the unoccupied second portion 84. The particles 52 are placed in the chamber 322 in the container 320 through a fill port 332, that is then closed and sealed by a plug 334. It should be apparent to those skilled in the art that the container 320 formed by the rim portion 22 could be subdivided into two or more separate containers.

The damper 330 functions to reduce the amplitude of the steering wheel vibration in the same basic manner as the damper 26 described above with regard to the first embodiment of FIGS. 1–4. Vibration of the steering wheel 12 causes the particles 52 in the container 320 to move back and forth in the chamber 322 in the container. The collision of the particles 52 with each other and with the interior wall 324 inside the chamber 322 dissipates vibrational energy and thus damps vibration of the steering wheel 12.

FIG. 15 illustrates an alternate construction of the third embodiment of the present invention illustrated in FIGS. 13 and 14. In FIG. 15, reference numbers that are the same as those used in the previous embodiments designate components that are the same as components in the previous embodiments.

In FIG. 15, the annular rim portion 22 forms a container comprising a U-shaped base member 362 and a cap member 364. The cap member 364 is secured, in a manner not shown, over the open end of the U-shaped member 362 to form a chamber 366 inside the container. The chamber 366 is defined by a plurality of interior walls 368. A flexible enclosure 370 containing the particles 52 is placed in the chamber 366 prior to the cap member 364 being attached to the U-shaped member 362. The enclosure 370 partially (70% to 98%) fills the chamber 366 to create a damper 380. The partially filled chamber 366 includes the first portion 82 occupied by the particles 52 in the enclosure 370 and the unoccupied second portion 84. It should be apparent to those skilled in the art that the container 360 formed by the rim portion 22 could be subdivided into two or more separate containers. It should also be apparent that more than one enclosure 370 filled with particles could be placed into the chamber 360 in the rim portion 22.

The damper 380 functions to reduce the amplitude of the steering wheel vibration in the same manner as the damper 330 described above with regard to the third embodiment. Vibration of the steering wheel 12 causes the particles 52 in the enclosure 370 to move back and forth in the chamber 366 in the container 360. The collision of the particles 52 with each other and with the interior walls 368 inside the chamber 366 dissipates vibrational energy and thus damps vibration of the steering wheel 12.

FIG. 16 illustrates a steering column assembly 410 constructed in accordance with a fourth embodiment of the present invention. In FIG. 16, reference numbers that are the same as those used in the first embodiment of FIGS. 1–4 designate components that are the same as components in the first embodiment.

According to the fourth embodiment, the steering column assembly 410 includes the steering wheel 12 and a back cover 414. The back cover 414 is attached to the steering wheel 12 by snap-in fasteners 416, but may be attached by other suitable means. The back cover 414 covers over the back side of the steering wheel 12 and defines an annular cavity for receiving a known rotary connector (or clock spring) 418 shown schematically in FIG. 16.

The back cover 414 includes a container 430. The container 430 has a plurality of interior walls 432 that define a chamber 440 inside the container. The chamber 440 contains the particles 52. The particles 52 are placed in the chamber 440 through a fill port (not shown) to create a damper 460. The chamber 440 is partially filled (70% to 98%) with the particles 52, and thus includes the first portion 82 occupied by the particles and the unoccupied second portion 84. It should be apparent to those skilled in the art that the container 430 could be subdivided into two or more separate containers.

The damper 460 functions to reduce the amplitude of the steering wheel vibration in the same manner as the damper 26 described above with regard to the first embodiment. Vibration of the steering wheel 12 causes the particles 52 in the container 430 to move back and forth in the chamber 440 in the container. The collision of the particles 52 with each other and with the interior walls 432 inside the chamber 440 dissipates vibrational energy and thus damps vibration of the steering wheel 12.

FIGS. 17 and 18 illustrate a steering column assembly 510 constructed in accordance with a fifth embodiment of the present invention. In FIGS. 17 and 18, reference numbers that are the same as those used in the first embodiment of FIGS. 1–4 designate components that are the same as components in the first embodiment.

According to the fifth embodiment, the steering wheel assembly 510 includes a damper 520 attached to one of the spokes 24 by fasteners 522. The damper 520 comprises a container 530 having a plurality of interior walls 532 that define a chamber 540 inside the container. The chamber 540 contains the particles 52. The particles 52 are placed in the chamber 540 through a fill port (not shown). The chamber 540 is partially filled (70% to 98%) with the particles 52, and thus includes the first portion 82 occupied by the particles and the unoccupied second portion 84. It should be apparent to those skilled in the art that more than one or all of the spokes 24 of the steering wheel assembly 510 could have a damper, such as the damper 520, attached to it.

The damper 520 functions to reduce the amplitude of the steering wheel vibration in the same manner as the damper 26 described above with regard to the first embodiment. Vibration of the steering wheel 12 causes the particles 52 in the container 530 to move back and forth in the chamber 540 in the container. The collision of the particles 52 with each other and with the interior walls 532 inside the chamber 540 dissipates vibrational energy and thus damps vibration of the steering wheel 12.

FIG. 19 illustrates a steering column assembly 610 constructed in accordance with a sixth embodiment of the present invention. In FIG. 19, reference numbers that are the same as those used in the first embodiment of FIGS. 1–4 designate components that are the same as components in the first embodiment.

According to the sixth embodiment, the steering column assembly 610 includes an inflatable vehicle occupant protection device 620, mounted to the steering wheel 12. The inflatable vehicle occupant protection device (commonly referred to as an air bag module) 620 is attached to the steering wheel 12 by a suitable fastening means (not shown). As is known in the art, the airbag module 620 includes an inflatable air bag 622, an inflator 624 for inflating the air bag, a reaction plate 626 on which the inflator is mounted, and a retaining ring 628 for securing the air bag to the reaction plate about the inflator.

A ring-shaped container 630 is secured to a lower surface 631 of the reaction plate 626. The container 630 has a plurality of interior walls 632 that define a chamber 640 inside the container. The chamber 640 contains the particles 52. The particles 52 are placed in the chamber 640 through a fill port (not shown) to create a damper 660. The chamber 640 is partially filled (70% to 98%) with the particles 52, and thus includes the first portion 82 occupied by the particles and the unoccupied second portion 84. It should be apparent to those skilled in the art that the container 630 could be subdivided into two or more separate containers.

The damper 660 functions to reduce the amplitude of the steering wheel vibration in the same manner as the damper 26 described above with regard to the first embodiment. Vibration of the steering wheel 12 causes the particles 52 in the container 630 to move back and forth in the chamber 640 in the container. The collision of the particles 52 with each other and with the interior walls 632 inside the chamber 640 dissipates vibrational energy and thus damps vibration of the steering wheel 12.

FIGS. 20 and 21 illustrate a steering column assembly 710 constructed in accordance with a seventh embodiment of the present invention. In FIGS. 20 and 21, reference numbers that are the same as those used in the previous embodiments designate components that are the same as components in the previous embodiments.

According to the seventh embodiment, the steering column assembly 710 includes a damper 720 associated with one of the spokes 24. As may be seen in FIG. 21, the spoke 24 has a U-shape that defines a cavity (not numbered) in the spoke. A U-shaped cover 722 is attached, in a manner not shown, over the open end of the cavity in the spoke 24 to form a container 730. As is known in the art, the spokes 24 and the rim 22 of the steering wheel assembly 710 can be covered with a layer 750 of urethane or polyurethane.

The container 730 has a plurality of interior walls 732 that define a chamber 740 inside the container. The chamber 740 contains the particles 52. The particles 52 are placed in the chamber 740 through a fill port (not shown). As shown in FIG. 20, the chamber 740 is partially filled (70% to 98%) with the particles 52, and thus includes the first portion 82 occupied by the particles and the unoccupied second portion 84. It should be apparent to those skilled in the art that more than one or all of the spokes 24 of the steering wheel assembly 710 could include one of the dampers 720.

The damper 720 functions to reduce the amplitude of the steering wheel vibration in the same manner as the damper 26 described above with regard to the first embodiment. Vibration of the steering wheel 12 causes the particles 52 in the container 730 to move back and forth in the chamber 740 in the container. The collision of the particles 52 with each other and with the interior walls 732 inside the chamber 740 dissipates vibrational energy and thus damps vibration of the steering wheel 12.

Figure 22:
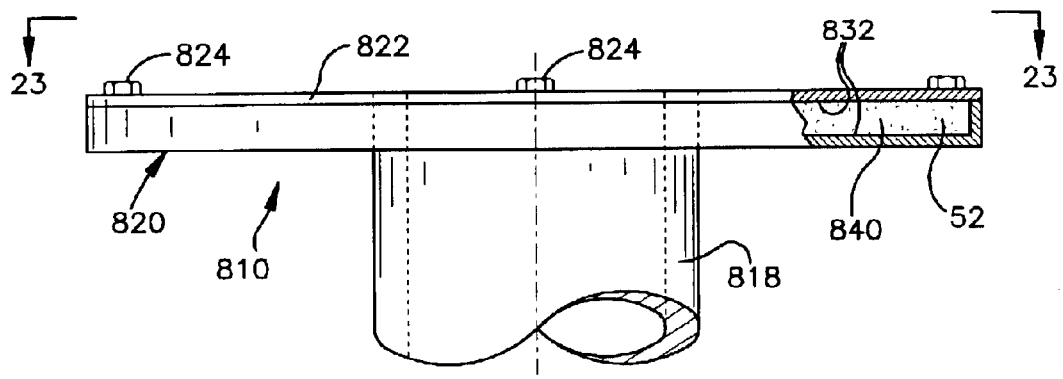
FIG. 22 is a side view of an apparatus constructed in accordance with an eighth embodiment of the present invention.
Figure 23:
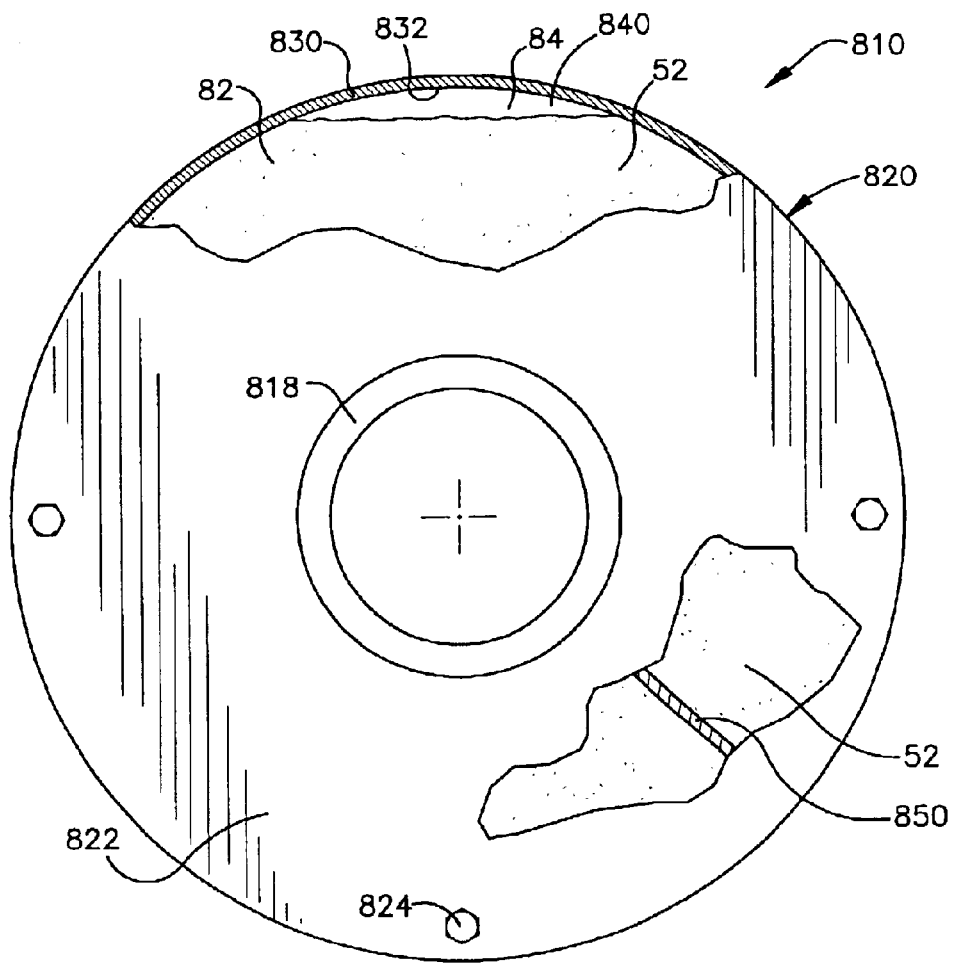
FIG. 23 is a view taken along line 23—23 in FIG. 22.
Figure 24:
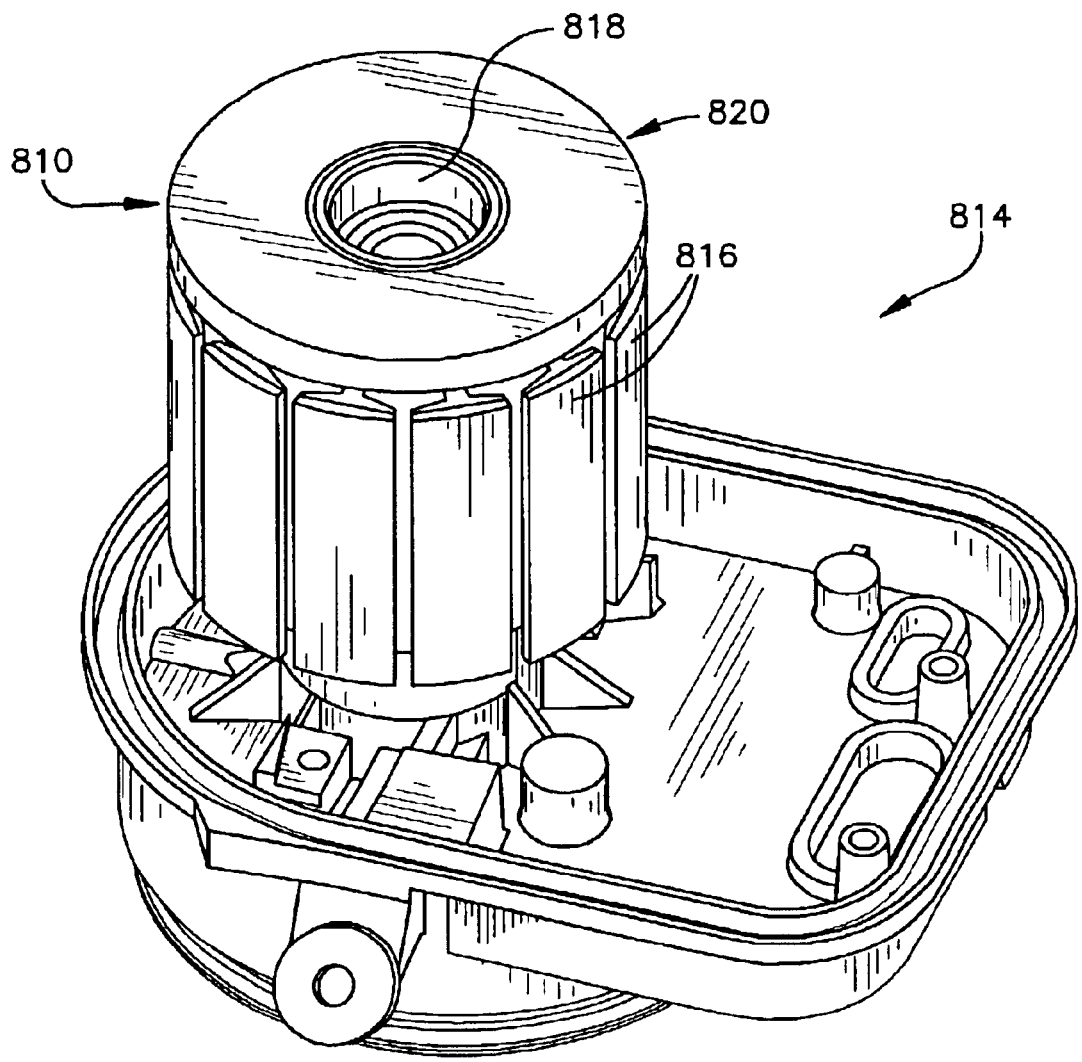
FIG. 24 is a perspective view of a portion of an electric motor incorporating the apparatus of FIG. 22.

FIGS. 22–24 illustrate an apparatus 810 constructed in accordance with an eighth embodiment of the present invention. In FIGS. 22–24, reference numbers that are the same as those used in the previous embodiments designate components that are the same as components in the previous embodiments.

According to the eighth embodiment, the apparatus 810 comprises a damper 820 for damping both torsional and lateral vibration of an electric motor 814, such as is used in an electric powered hydraulic steering (EPHS) system. The electric motor 814 has an "inside-out" design in which motor windings are located on a stationary component or stator 816 and permanent magnets (not shown) are located on a rotary component or rotor (not shown). The stator 816 is mounted on a spigot 818. The damper 820 is attached to the stator 816 of the electric motor 814. The damper 820 comprises an open-ended container 830 that is closed by a cover plate 822. The cover plate 822 is attached to the container 830 by fasteners 824.

The container 830 has a plurality of interior walls 832 that define a chamber 840 inside the container. The chamber 840 contains the particles 52. The particles 52 may be placed into the chamber 840 through a fill port (not shown), or prior to the attachment of the cover plate 822. As shown in FIG. 23, the chamber 840 is partially filled (70% to 98%) with the particles 52, and thus includes the first portion 82 occupied by the particles and the unoccupied second portion 84. It should be apparent to those skilled in the art that more than one chamber 840 could be formed inside the container 830. One or more radially extending baffles 850 may be located inside the chamber 840 to sub-divide the chamber 840 into multiple chambers to increase the energy dissipation.

Certain multiples of the motor speed coincide with the resonant modes of the stator 816 and cause unwanted vibration and noise. The damper 820 functions to reduce the amplitude of torsional and lateral vibration in the electric motor 814 due to electromagnetic torques that are produced by the interaction of the rotor (not shown) and the stator 816. Further, the damper 820 reduces the amplitude of non-linear vibration of the interface of the stator 816 and the spigot 818. The vibration of the stator 816 causes the particles 52 in the container 830 to move back and forth in the chamber 840 in the container. The collision of the particles 52 with each other and with the interior walls 832 inside the chamber 840 dissipates vibrational energy and thus damps both torsional and lateral vibration of the electric motor 814.

From the above description of the invention, those skilled in the art will perceive improvements, changes and modifications. For example, it should be apparent that the present invention, as set forth above, could be adapted for use in damping vibration of many other parts in a vehicle. Such improvements, changes and modifications within the skill of the art are intended to be covered by the appended claims.

Having described the invention, we claim:

1. An apparatus for damping vibration of a part of an automobile, said apparatus comprising:
   at least one container having a chamber defined by at least one interior wall, said at least one container being associated with the part of the automobile; and
   a plurality of particles disposed in said chamber, said particles when at rest occupying a first portion of said chamber and defining an unoccupied second portion of said chamber;
   said particles moving back and forth between said first and second portions of said chamber in response to vibration of the part of the automobile and colliding with each other and said at least one interior wall defining said chamber to damp the vibration of the part of the automobile through a momentum exchange between said particles and said at least one interior wall, through inter-particle dry friction and dry friction between said particles and said at least one interior wall, and through plastic deformation of the particles.

2. The apparatus of claim 1 wherein said at least one container comprises a plurality of containers attached to the vehicle part.

3. The apparatus of claim 1 wherein said particles comprise a powder made from a single material.

4. The apparatus of claim 3 wherein said material of said particles is selected from the group consisting of metals, metal alloys, metallic oxides, ceramics, glass, and polymers.

5. The apparatus of claim 1 wherein each of said particles is 10 microns to 2 mm in size.

6. The apparatus of claim 1 wherein said particles have a total weight of 0.1 lbs. to 10 lbs.

7. The apparatus of claim 1 wherein said first portion of said chamber that is occupied by said particles is 70% to 98% of the total volume of said chamber.

8. An apparatus for damping vibration of a vehicle part, said apparatus comprising:
   at least one container having a chamber defined by at least one interior wall, said at least one container being associated with the vehicle part; and
   a plurality of particles disposed in said chamber, said particles when at rest occupying a first portion of said chamber and defining an unoccupied second portion of said chamber;
   said particles moving back and forth between said first and second portions of said chamber in response to vibration of the vehicle part and colliding with each other and said at least one interior wall defining said chamber to damp the vibration of the vehicle part through a momentum exchange between said particles and said at least one interior wall, through inter-particle dry friction and dry friction between said particles and said at least one interior wall, and through plastic deformation of the particles,
   wherein said at least one container is at least partially shaped like a ring.

9. An apparatus for damping vibration of a vehicle part, said apparatus comprising:
   at least one container having a chamber defined by at least one interior wall, said at least one container being associated with the vehicle part; and
   a plurality of particles disposed in said chamber, said particles when at rest occupying a first portion of said chamber and defining an unoccupied second portion of said chamber;
   said particles moving back and forth between said first and second portions of said chamber in response to vibration of the vehicle part and colliding with each other and said at least one interior wall defining said chamber to damp the vibration of the vehicle part through a momentum exchange between said particles and said at least one interior wall, through inter-particle dry friction and dry friction between said particles and said at least one interior wall, and through plastic deformation of the particles,
   wherein the vehicle part is a steering wheel, said at least one container being connected with the steering wheel.

10. An apparatus for damping vibration of a vehicle part, said apparatus comprising:
    at least one container having a chamber defined by at least one interior wall, said at least one container being associated with the vehicle part; and
    a plurality of particles disposed in said chamber, said particles when at rest occupying a first portion of said chamber and defining an unoccupied second portion of said chamber;
    said particles moving back and forth between said first and second portions of said chamber in response to vibration of the vehicle part and colliding with each other and said at least one interior wall defining said chamber to damp the vibration of the vehicle part through a momentum exchange between said particles and said at least one interior wall, through inter-particle dry friction and dry friction between said particles and said at least one interior wall, and through plastic deformation of the particles,
    wherein the vehicle part is an electric motor, said at least one container being connected with the electric motor.

11. An apparatus comprising:
    a vehicle steering column assembly;
    at least one container associated with said vehicle column steering assembly, said at least one container having a chamber defined by at least one interior wall; and
    a plurality of particles disposed in said chamber, said particles when at rest occupying a first portion of said chamber and defining an unoccupied second portion of said chamber;

said particles moving back and forth between said first and second portions of said chamber in response to vibration of the vehicle steering column assembly and colliding with each other and with said at least one interior wall defining said chamber to damp the vibration of the vehicle steering column assembly through a momentum exchange between said particles and said at least one interior wall, through inter-particle dry friction and dry friction between said particles and said at least one interior wall, and through plastic deformation of the particles.

12. The apparatus of claim 11 wherein said vehicle steering column assembly includes a steering wheel mounted on a steering shaft.

13. The apparatus of claim 12 wherein said at least one container is connected with said steering wheel.

14. The apparatus of claim 12 wherein said steering wheel comprises a centrally located hub portion, an annular rim portion, and a plurality of spokes extending between said hub portion and said rim portion.

15. The apparatus of claim 14 wherein said at least one container is connected with said hub portion of said steering wheel.

16. The apparatus of claim 15 wherein said at least one container is at least partially formed by a portion of said hub portion.

17. The apparatus of claim 14 wherein said at least one container is at least partially shaped like a ring.

18. The apparatus of claim 17 wherein said at least one container comprises a collar disposed coaxially about said steering shaft.

19. The apparatus of claim 18 wherein said collar is formed by a pair of containers that are joined together.

20. The apparatus of claim 14 wherein said rim portion of said steering wheel forms at least a portion of said at least one container.

21. The apparatus of claim 20 wherein said electric motor includes a stationary part having motor windings.

22. The apparatus of claim 21 wherein said at least one container is connected with said stationary part.

23. The apparatus of claim 21 wherein said at least one container comprises a plurality of containers attached to said stationary part.

24. The apparatus of claim 14 wherein said at least one container is connected with at least one of said plurality of spokes.

25. The apparatus of claim 12 wherein said steering wheel includes a cover attached to said steering wheel and covering a portion of said steering wheel, said at least one container being formed in said cover.

26. The apparatus of claim 12 wherein said steering column assembly includes an inflatable vehicle occupant protection device attached to said steering wheel, said at least one container being attached to said inflatable vehicle occupant protection device.

27. The apparatus of claim 11 wherein said at least one container comprises a plurality of containers attached to said vehicle steering column assembly.

28. The apparatus of claim 11 wherein said particles comprise a powder made from a single material.

29. The apparatus of claim 28 wherein said material of said particles is selected from the group consisting of metals, metal alloys, metallic oxides, ceramics, glass, and polymers.

30. The apparatus of claim 11 wherein each of said particles is 10 microns to 2 mm in size.

31. The apparatus of claim 11 wherein said particles have a total weight of 0.1 lbs. to 10 lbs.

32. The apparatus of claim 11 wherein said first portion of said chamber that is occupied by particles is 70% to 99% of the total volume of said chamber.

33. An apparatus for use in a vehicle, said apparatus comprising:

an electric motor;

at least one container associated with said electric motor, said at least one container having a chamber defined by at least one interior wall; and a plurality of particles disposed in said chamber, said particles when at rest occupying a first portion of said chamber and defining an unoccupied second portion of said chamber;

said particles moving back and forth between said first and second portions of said chamber in response to vibration of said electric motor and colliding with each other and with said at least one interior wall defining said chamber to damp the vibration of said electric motor through a momentum exchange between said particles and said at least one interior wall, through inter-particle dry friction and dry friction between said particles and said at least one interior wall, and through plastic deformation of the particles.

34. The apparatus of claim 33 wherein said particles comprise a powder made from a single material.

35. The apparatus of claim 34 wherein said material of said particles is selected from the group consisting of metals, metal alloys, metallic oxides, ceramics, glass, and polymers.

36. The apparatus of claim 33 wherein each of said particles is 10 microns to 2 mm in size.

37. The apparatus of claim 33 wherein said particles have a total weight of 0.1 lbs. to 10 lbs.

38. The apparatus of claim 33 wherein said first portion of said chamber that is occupied by particles is 70% to 98% of the total volume of said chamber.

39. A method for damping vibration of a vehicle steering column assembly, said method comprising the steps of:

providing at least one container having a chamber defined by at least one interior wall;

associating the at least one container with the vehicle steering assembly;

filling 70% to 98% of the chamber in the at least one container with a plurality of particles so that a first portion of the chamber is occupied by the particles when at rest while a second portion of the chamber remains unoccupied; and damping vibration of the vehicle steering column assembly through movement of the particles back and forth between the first and second portions of the chamber in response to the vibration of the vehicle steering column assembly, the particles colliding with each other and the at least one interior wall defining the chamber to damp the vibration of the vehicle steering column assembly through a momentum exchange between the particles and the at least one interior wall, through inter-particle dry friction and dry friction between the particles and the at least one interior wall, and through plastic deformation of the particles.

40. The method of claim 39 wherein said step of connecting the at least one container includes forming at least a portion of the at least one container together with a portion of a steering wheel.

41. A method for damping vibration of an electric motor in a vehicle, said method comprising the steps of:

providing at least one container having a chamber defined by at least one interior wall;

associating the at least one container with the electric motor;

filling 70% to 98% of the chamber in the at least one container with a plurality of particles so that a first portion of the chamber is occupied by the particles when at rest while a second portion of the chamber remains unoccupied; and damping vibration of the electric motor through movement of the particles back and forth between the first and second portions of the chamber in response to the vibration of the electric motor, the particles colliding with each other and the at least one interior wall defining the chamber to damp the vibration of the electric motor through a momentum exchange between the particles and the at leas tone interior wall, through inter-particles dry friction and dry friction between the particles and the at least one interior wall, and through plastic deformation of the particles.

* * * * *

UNITED STATES PATENT AND TRADEMARK OFFICE
CERTIFICATE OF CORRECTION

PATENT NO. : 6,736,423 B2
DATED : May 18, 2004
INVENTOR(S) : Stepan S. Simonian et al.

It is certified that error appears in the above-identified patent and that said Letters Patent is hereby corrected as shown below:

Column 14,
Line 4, after "to" change "99%" to -- 98% --.

Column 16,
Line 6, after "at" change "leas tone" to -- least one --.

Signed and Sealed this

Twenty-first Day of December, 2004

JON W. DUDAS
*Director of the United States Patent and Trademark Office*